T. Fairbanks,
Scale Beam.
No. 102,791. Patented May 10, 1870.
Fig. 1.
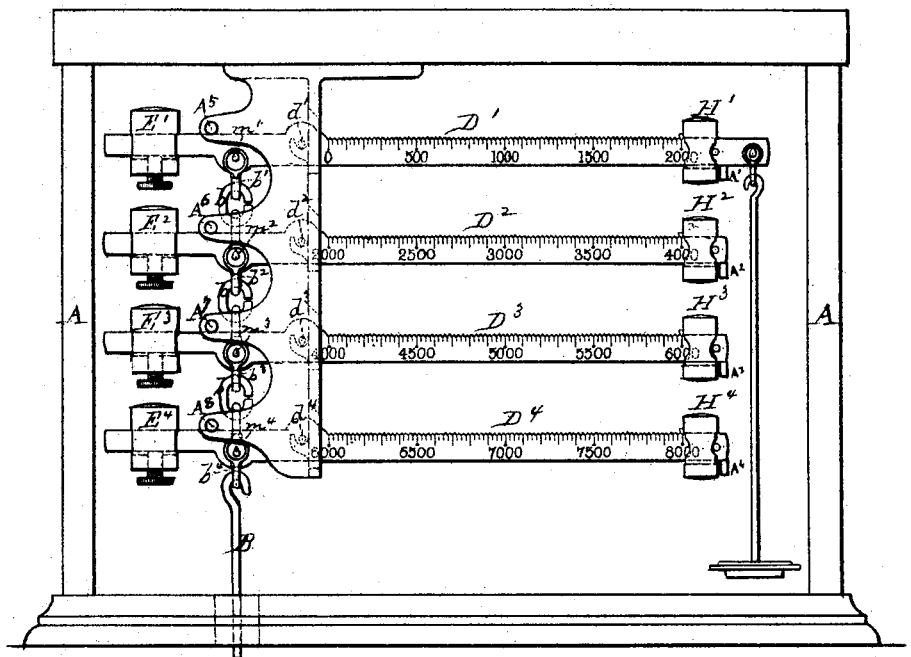
Fig. 3. Fig. 2. Fig. 5.
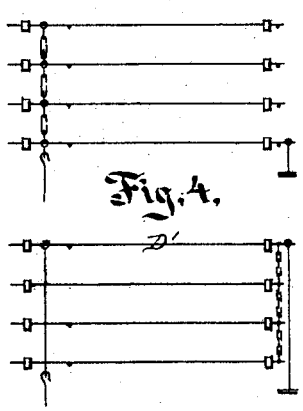
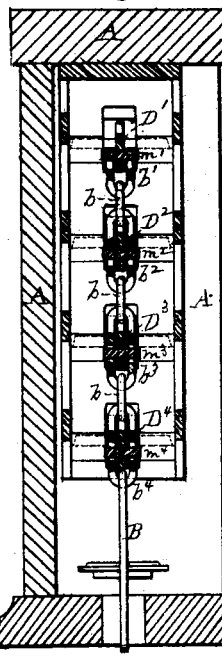
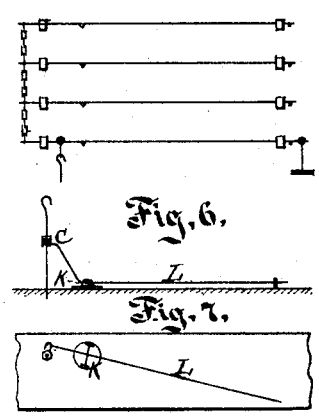
Fig. 4. Fig. 6.
Fig. 7.
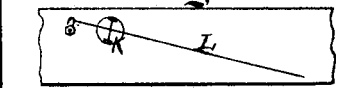
Witnesses,
A. Hoermann
W. C. Dey
Inventor,
T. Fairbanks
by his atty
J. L. Stetson

United States Patent Office.

THADDEUS FAIRBANKS, OF ST. JOHNSBURY, VERMONT.

Letters Patent No. 102,791, dated May 10, 1870.

IMPROVEMENT IN WEIGHING-SCALES.

The Schedule referred to in these Letters Patent and making part of the same

*To all whom it may concern:*

Be it known that I, THADDEUS FAIRBANKS, of St. Johnsbury, in the county of Caledonia, in the State of Vermont, have invented certain new and useful Improvements in Weighing Scales; and I do hereby declare that the following is a full and exact description thereof.

My invention is intended to facilitate the weighing of widely-varying quantities with the same machine, without necessitating any delay for adjustment or change of counterpoise.

It allows of a higher degree of delicacy in the construction and proportioning of the beams, knife-edges, links, &c., than is allowable with the ordinary construction of scales, having an equally high range or capacity. It also allows of more detail in the graduation.

I mount a series of loaded levers, so that they shall be lifted successively.

I will proceed to describe what I consider the best means of carrying out my invention, and will afterward designate the points which I believe to be new therein.

The accompanying drawings form a part of this specification.

Figure 1 is a front elevation, and

Figure 2 is a vertical section through the parts in the plane of the steelyard knife-edges.

The additional figures or outline diagrams indicate the arrangement of the parts, according to certain modifications, affording the benefit of a part of my invention.

Similar letters of reference indicate corresponding parts in all the figures.

A is the fixed frame-work;

B is the steelyard rod, through which the weight is transmitted from the platform or other ordinary device below, not represented; and $D^1$ $D^2$ $D^3$ $D^4$ are a series of beams, each mounted on its respective knife-edges $d^1$ $d^2$ $d^3$ $d^4$, balanced by a suitable adjustable ball, $E^1$ $E^2$ $E^3$ $E^4$, and carrying a poise, $H^1$ $H^2$ $H^3$ $H^4$.

Each is provided with a rest, $A^1$ $A^2$ $A^3$ $A^4$, which supports the long arm of the lever against sinking too low, but each is free to rise as high as is necessary.

The uppermost beam $D^1$ is made a little longer than the other, and carries a counterpoise-rod, on which may be placed a changeable counterpoise, as will be obvious.

The connection of the steelyard-rod B to these several beams is peculiar.

There is a steelyard knife-edge in the ordinary position on each beam, marked $m^1$ $m^2$ $m^3$ $m^4$. The connection from the steelyard-rod B is a chain of links.

When the scale is unloaded, the links $b^1$ $b^2$ $b^3$ $b^4$ embrace all the steelyard knife-edges loosely, except the uppermost, and the whole weight or tension of the steelyard-rod B comes on the uppermost, $m^1$, and, consequently on the upper beam $D^1$ alone, it follows that the upper beam alone feels the weight, and behaves under it exactly as if the other beam had no existence.

The poise $H^1$, being moved outward and inward on the upper beam $D^1$, determines the weight in the ordinary manner, unless the weight is more than the whole amount which this beam is capable of weighing. In such case, this upper beam $D^1$, having its poise $H^1$ moved to its extreme outermost position, is lifted, and, as soon as it is lifted, the link $b^2$ commences to bear on the steelyard knife-edge $m^2$, on the second beam $D^2$.

Now, under this condition, the scale will weigh as before, lifting, or tending to lift both the upper beam $D^1$, and the second or next beam below, marked $D^2$.

By moving the poise $H^2$ inward and outward on the second beam $D^2$ until the proper point is ascertained, the weight will be determined by the position of the poise on this second beam, and the beams being properly graduated, the weight will be read off directly on the second beam.

The weight will be the total weight which the first beam is capable of weighing, plus a portion of that which the second beam is capable of weighing. The same effect will follow the successive weighing on each of the other beams, that is to say, I commence with all the poises $H^1$ $H^2$ $H^3$ $H^4$ in their extreme outer position.

Now, if the weight, on being placed upon the platform suffices to lift the first beam $D^1$ and the second beam $D^2$, and the third beam $D^3$, but cannot lift the fourth beam $D^4$, while its weight $H^4$ is in its extreme outermost position, I know at once that the weight is greater than that which the first, second, and third beams are capable of weighing, and is somewhere within the weight which the entire scale is capable of weighing, and will be determined by moving the poise $H^4$ inward on the lowest beam $D^4$.

So much is determined instantly by inspection, and without any delay for adjustment of any part.

Now, by applying the finger, or, if preferred, any suitable mechanism, I move the fourth poise $H^4$ inward on its beam $D^4$.

When the proper point is reached, this beam $D^4$ will rise, and the exact weight is then determined by reading it from the fourth beam.

I have in my experiments graduated the several beams for two thousand pounds each, and have marked them in a successive series, that is, the upper beam $D^1$ is graduated from 0 to 2,000; the second beam, $D^2$, is graduated from 2,000 to 4,000; the third, $D^3$, from 4,000 to 6,000; the fourth, $D^4$, from 6,000 to 8,000; and the fifth, (I have employed five,) from 8,000 to 10,000.

As soon as the weight is determined, the poise is again moved to its extreme outermost position, and, on the load being removed, the scale is again in condition to receive, and again instantly indicate, on inspection, the approximate weight of the load, and allow the weight to be determined accurately, and read off directly, on moving a single poise.

There is no necessity for any beam lifting to any great extent, in order to determine the fact that it has lifted.

In my arrangement, the upper beam requires a certain amount of lift before the steelyard-rod has sunk sufficient to commence to bear upon the second beam. Then, when the load is sufficient to lift the second beam, the first beam must continue to rise correspondingly higher still.

Thus, when five, or any other considerable number of beams are employed, the upper beam must be allowed to lift to a correspondingly increased extent. This would involve inconvenience, and, possibly, inaccuracy, if a large amount of motion is allowed for each beam.

I can practically annihilate the chances of inaccuracy by the ordinary expedient of having the knife-edges exactly on a level with each other, and with the center of gravity of the beam and poise, having all these in the same plane, but I prefer to give but little motion to each beam before the load commences to bear upon the neck.

It is sufficient if each beam is allowed to indicate the fact that it has lifted. I provide means for determining the fact with a very slight lift of each.

I make the several beams bright, of polished brass or analogous material, so that it is clearly visible against the dark background in the back of the cupboard, and make the stops $A^1$ $A^2$ $A^3$ $A^4$ correspondingly polished or bright on their ends; in other words, the scale-beams raised in their natural position on the stops, under such conditions, with a slight lift will be visible. I esteem a half inch, or even less, amply sufficient in practice.

The brightness of the stop allow the fact to be indicated instantly, when the beam separates therefrom by lifting.

It will be obvious that if the back of the cupboard was open, or otherwise made very light, and the stops and beams were dark, such would serve as a partial or complete equivalent for the bright surfaces against a dark background.

I esteem it sufficient if the beams and stops are arranged as represented, and made conspicuously visible.

It will be observed that the links $b^1$ $b^2$ $b^3$ $b^4$ are connected together by the several links $b$, so that there is in effect a flexible chain, through which the force is transmitted from the steelyard-rod B to the one or more beams which are brought into action.

This may be replaced by a rigid bar, having suitable liberal openings therein, to allow the lower knife-edges $m^4$ $m^3$ $m^2$ $m^1$ to stand untouched therein, until the proper depression of the knife-edges, and, consequently, the proper slight tilting of the beams has taken place.

Many other modifications of the connection may be made by any good mechanic, without departing from the principle or sacrificing the advantages of my invention.

One modification might be made by attaching the weight in the reversed condition, that is, the chain or equivalent rigid bar may be made with the links so much longer that the load will come first on the lower beam, and then when this tilts, be afterward thrown upon the next, and so on through the series.

A portion of the benefit of my invention might be secured by making the uppermost or lowermost beam stronger, and having the knife-edges on which they are mounted correspondingly stronger, sufficient to make one beam the master-beam, and transmit through it all the force to the others, and then connecting the beams together by a loose chain attached to one or the other extremity.

The strain might be received through the upper beam and transmitted to the other beams through the agency of a chain connecting the long arms of the beam, that is, the ends which appear at the right, in fig. 1, or the strain might be transmitted entirely from the steelyard-rod B to the lower knife-edge $m^4$ alone, which would make the lower beam $D^4$ the master-beam, and its tilting with more or less force would tilt one or more of the others in succession, beginning with the next lowermost, and so on upward, the motion being communicated through a slack chain attached to the short ends of the beam, the left end in fig. 1.

The small figs. 3 to 5 represent scales in all these several conditions.

Figure 3 shows the force connected to each beam independently through the links $b^1$ $b^2$ $b^3$ $b^4$, arranged as represented in the principal figures, but made longer, so that the strain comes first on the lowermost beam, and afterward on the next lowest.

Figure 4 shows a construction, in which the upper beam $D^1$ is the master-beam, and the force is transmitted to the other beams through a slack chain at the right-hand side.

Figure 5 shows another modification, in which the lowermost beam $D^4$ is the master-beam, and the force is communicated therefrom to the other beams through a slack chain on the left-hand side.

I much prefer the arrangement represented in figs. 1 and 2, that being the one which I esteem most desirable, for various reasons, in practice. In either case, it is important that the main or supporting knife-edges $d^1$ $d^2$ $d^3$ $d^4$ be very firmly supported.

I prefer to support all these in one rigid casting, $A^1$, firmly fixed on the frame-work A, as represented.

It will be obvious that my invention allows of many obvious provisions for facilitating the correctness or convenience of the scale. Trig-loops, drop-levers, screw-poises, and the like may be employed on one or all of my beams, care being taken to allow that the uppermost beam, as here arranged, shall have sufficient freedom of motion.

I propose, as a special means of relieving this peculiar scale from strain when the weight is being put on or taken off, or when, for any reason, it is desired that the beams shall not be tilted or agitated, to interpose a stop, taking hold directly on the hook at the upper end of the steelyard-rod, or taking hold of some nut or other suitable stop fixed on said rod, so as to entirely relieve the beams from load, except when the weighing is to be effected.

The small outline diagrams, or figs 6 and 7, represent one of the forms in which these suggestions may be made available to contribute to the usefulness or convenience of my invention.

Figure 6 is an elevation, and

Figure 7, a plan.

In these figures, K is a plate, adapted to turn on the base of the cupboard.

It carries the fulcrum of a lever, L, which, when the lever is tilted up, can be made to engage with or disengage from the nut C on the steelyard-rod B.

When the lever L is in the position shown in fig. 7, it is of no effect, and any weight thrown upon the platform of the scale operates the beams $D^1 D^2$, as has been described; but, when it is desired to relieve the beams from strain, I can seize and elevate the long arm of the lever L, then turn the said lever with the supporting-plate K, until the short arm of the lever L engages under the nut C; then depress the long arm of the lever L, and thereby lift slightly the nut C with the steelyard-rod B, on which it is fixed, and hook the long arm of the lever L under a hook, M, which will hold it, and thus leave the beams $D^1 D^2$, &c., unaffected by any load on the platform, or by any concussion thereon, until it is again liberated by a reverse of this operation.

I claim—

1. In weighing-scales, the series of beams and poises $D^1 H^1 D^2 H^2$, &c., combined and arranged relatively to each other, and to connections, as represented, so as to bring them into play in a greater or lesser number, according to the magnitude of the load, as herein specified.

2. The conspicuous stops $A^1 A^2$, &c., arranged as represented relatively to the series of beams $D^1 D^2$, &c., when the latter are connected and made to rise in succession as the weight is increased, all substantially as and for the purposes herein specified.

In testimony whereof I have hereunto set my name in presence of two subscribing witnesses.

THADDEUS FAIRBANKS.

Witnesses:
HENRY FAIRBANKS,
A. N. FAIRBANKS.